(12) United States Patent
Singh

(10) Patent No.: US 7,434,087 B1
(45) Date of Patent: Oct. 7, 2008

(54) GRACEFUL FAILOVER USING AUGMENTED STUBS

(75) Inventor: Servesh Pratap Singh, Kanpur (IN)

(73) Assignee: Sun Microsystems, Inc., Santa Clara, CA (US)

( * ) Notice: Subject to any disclaimer, the term of this patent is extended or adjusted under 35 U.S.C. 154(b) by 765 days.

(21) Appl. No.: 10/851,844

(22) Filed: May 21, 2004

(51) Int. Cl.
*G06F 11/00* (2006.01)

(52) U.S. Cl. .......................................... 714/4
(58) Field of Classification Search ............... 714/4
See application file for complete search history.

(56) References Cited

U.S. PATENT DOCUMENTS

| | | | |
|---|---|---|---|
| 4,633,245 A | 12/1986 | Blount et al. | |
| 5,862,331 A * | 1/1999 | Herriot | 709/219 |
| 5,951,694 A * | 9/1999 | Choquier et al. | 714/15 |
| 6,006,259 A | 12/1999 | Adelman et al. | |
| 6,018,805 A * | 1/2000 | Ma et al. | 714/4 |
| 6,173,374 B1 | 1/2001 | Heil et al. | |
| 6,185,601 B1 | 2/2001 | Wolff et al. | |
| 6,314,465 B1 | 11/2001 | Paul et al. | |
| 6,351,775 B1 | 2/2002 | Yu | |
| 6,463,454 B1 | 10/2002 | Lumelsky et al. | |
| 6,581,088 B1 * | 6/2003 | Jacobs et al. | 718/105 |
| 6,697,849 B1 | 2/2004 | Carlson | |
| 6,728,748 B1 | 4/2004 | Mangipudi et al. | |
| 6,779,017 B1 | 8/2004 | Lamberton et al. | |
| 6,850,982 B1 | 2/2005 | Siegel | |
| 6,874,031 B2 | 3/2005 | Corbeil | |
| 6,880,089 B1 | 4/2005 | Bommareddy et al. | |
| 6,886,035 B2 | 4/2005 | Wolff | |
| 6,944,788 B2 * | 9/2005 | Dinker et al. | 714/4 |
| 7,003,574 B1 | 2/2006 | Bahl | |
| 7,302,609 B2 * | 11/2007 | Matena et al. | 714/15 |
| 7,321,983 B2 * | 1/2008 | Amarnath et al. | 714/4 |
| 2002/0010798 A1 * | 1/2002 | Ben-Shaul et al. | 709/247 |
| 2002/0073409 A1 * | 6/2002 | Lundback et al. | 717/170 |
| 2003/0014526 A1 | 1/2003 | Pullara et al. | |
| 2003/0051188 A1 * | 3/2003 | Patil | 714/4 |

(Continued)

OTHER PUBLICATIONS

Mitzenmacher et al., "Load Balancing with Memory," The 43rd Annual IEEE Symposium on Foundations of Computer Science, Nov. 16-19, 2002, (1 page).

(Continued)

*Primary Examiner*—Joshua A Lohn
(74) *Attorney, Agent, or Firm*—Robert C. Kowert; Meyertons, Hood, Kivlin, Kowert & Goetzel, P.C.

(57) ABSTRACT

Various embodiments of a system and method for failing over one cluster node to another are disclosed. The system may include a client networked to a cluster of computer nodes, connected to a persistent data store such as a database resident on a backend system. Each node of the cluster may be configured to run a distributed application component. The client may be configured to communicate with an instance of the application running on a first node. The client may include an augmented stub capable of accessing the instance of the application on the first node and capable of detecting a failure of the first node. In response to detecting a failure in the first node, the augmented stub may be capable of failing over to a second node and accessing the instance of the application on the second node, transparently to the client.

17 Claims, 10 Drawing Sheets

U.S. PATENT DOCUMENTS

| | | | |
|---|---|---|---|
| 2004/0059735 A1* | 3/2004 | Gold et al. ................... | 707/100 |
| 2004/0243709 A1 | 12/2004 | Kalyanavarathan et al. | |
| 2004/0250248 A1* | 12/2004 | Halpern et al. .............. | 718/100 |
| 2005/0198327 A1* | 9/2005 | Iwamura et al. ............. | 709/229 |
| 2005/0210084 A1* | 9/2005 | Goldick et al. .............. | 707/205 |
| 2006/0080446 A1 | 4/2006 | Bahl | |
| 2007/0226323 A1* | 9/2007 | Halpern ...................... | 709/222 |

OTHER PUBLICATIONS

Gibbens et al., "Dynamic Routing in Multiparented Networks," IEEE/ACM Transactions on Networking, vol. 1, No. 2, Apr. 1993, (pp. 261-270).

* cited by examiner

GRACEFUL FAILOVER USING AUGMENTED STUBS

BACKGROUND

1. Field of the Invention

This invention relates to computer systems, and more particularly to detecting and recovering from node failures in a cluster environment.

2. Description of the Related Art

Distributed applications are often implemented as part of commercial and non-commercial business solutions for an enterprise. For example, a company may leverage the use of an enterprise application that includes various databases distributed across multiple computers. Applications of this type, which support E-commerce, typically support hundreds or thousands of sessions simultaneously during periods of peak utilization. For scalability and fault tolerance, the servers running such applications may be clustered.

FIG. 1 illustrates a networked computer system including a cluster 100, according to prior art. Clients 110 may be coupled to cluster 100 through network 120. Clients 110 may initiate sessions with application components running on nodes 140. Load balancer 130 may distribute session requests from clients 100 to nodes 140 to "balance" the total workload among the servers. In some cases, load balancing may amount to nothing more than round-robin assignment of new sessions to cluster members. In other cases, load balancer 130 may have access to data concerning the current workload of each node 140. When a new session request is received, load balancer 130 may use this data to determine which server has the "lightest" workload and assign the new session to that node. Regardless of the distribution algorithm used by the load balancer 130, the capacity of the application component(s) running on the nodes 140 of the cluster is greater that if it were limited to only a single node, and most architectures for cluster 100 include scalability to allow for increasing capacity by adding additional nodes 140 to the cluster.

Another desirable characteristic of an application component(s) executing on a server cluster is high availability. For an application component running in a non-clustered environment, the failure of its server makes the component unavailable until the server is repaired or replaced. This loss of service may be very undesirable for an enterprise, particularly if the function being performed by the application component is, for example, registering orders for products or services. If the application component is executing on a cluster, one or more nodes 140 within the cluster can fail, and the application may continue to provide service on the remaining active servers, although at a reduced capacity. This attribute of a clustered server environment is called "failover", and it can be implemented in a variety of ways. In some cases, the load balancer 130 may determine that a given node 140 has failed and simply not assign any further work to that node. This insures that new requests will receive service, but does nothing for work that was in-process on the failed server.

Many cluster architectures have been formulated to address the need for graceful failover of cluster members to attempt to minimize the impact of server failure on end users. For a failover to be truly graceful, it should be completely transparent to the client. In most cases, graceful failover within a cluster requires the nodes 140 to be "cluster-aware" to the point of being able to detect the failure of fellow cluster members, and in some cases each server needs to be able to resume the processing of jobs that were executing on the failed server at the time it failed. The increase in complexity for each node 140 to support this level of graceful failover may be quite large in terms of the design, verification, and maintenance of the additional functionality.

It is common in clustered systems running distributed applications that once a client 110 has established a session with a particular instance of an application component, the load balancer 130 will thenceforth, direct client requests associated with that session to the node 140 running that instance of the application component. This may allow facilitate the maintenance of session state data coherency, but can create problems for the client 110 when that particular node 140 fails. Since the client 110 makes service requests over a connection, which has the failed node 140 as an endpoint, failure of this node may result in communications failure from the perspective of the client. Also, state data associated with that particular session may become unavailable with the loss of the node 140.

SUMMARY

Various embodiments of a system and method for failing over one cluster node to another are disclosed. The system may include a client networked to a cluster of computer nodes, connected to a persistent data store such as a database resident on a backend system. Each node of the cluster may be configured to run a distributed application component. The client may be configured to communicate with an instance of the application running on a first node. The client may include an augmented stub configured to provide an interface for accessing the instance of the application on the first node and capable of detecting a failure of the first node. In response to detecting a failure in the first node, the augmented stub may be capable of failing over to a second node and providing an interface for accessing the instance of the application on the second node, transparently to the client.

The system may also include a naming service for locating application components by means of lookup requests. The naming service may be configured to receive a lookup request from a client for a particular application component and determining whether or not the requested component is executing on more than one node of a cluster. If the naming service determines that the component is running on multiple nodes, it may return an augmented stub to the requesting client. If, on the other hand, the naming service determines that the component is not running on multiple nodes, it may simply return a normal stub.

In one embodiment, the augmented stub may include a stub to communicate with the node on which the client is currently accessing an instance of the application component and cluster data indicating which of the other cluster nodes are capable of executing an instance of the application component. In the event of a failure of this node, the augmented stub may be capable of selecting a new node based on the cluster data, and obtaining a new stub linked to the selected node. In one embodiment, the augmented stub may obtain the new stub from the naming service through a lookup request. The augmented stub may replace the current stub linked to the failed node with the new stub linked to the new node. Once the new stub is operational, the augmented stub may retry and/or resume communication with the new node.

In another embodiment, the augmented stub may include a group or array of stubs, one of which is used to communicate with the node on which the client is currently accessing an instance of the application component. The stubs, aside from the one currently in use, may each be linked to another node in the cluster that is capable of executing an instance of the application component. In the event of a failure of the node currently being accessed, the augmented stub may be capable of selecting a new stub and retrying and/or resuming communication with the new node.

In one embodiment, each node of the cluster may maintain cluster state data including cluster membership data. The cluster state data may also include a unique identifier that indicates the cluster configuration during a given period of time. Each cluster node may be capable of detecting changes to the cluster configuration. In one embodiment, this may include some central agent that detects node additions and deletions and sends update information to all cluster members. When a membership change is detected, each member may alter its cluster state data to reflect the change. This alteration of cluster state data may include the changing of the unique identifier. In some embodiments, the unique identifier may be a number, for example an epoch number, and may be incremented each time there is a change in cluster membership.

At some point in time a cluster node may receive a unique identifier from an augmented stub indicating the configuration in which the augmented stub believes the cluster to be. The node may compare the received unique identifier with its own unique identifier. If the two unique identifiers differ, the node may return its copy of the cluster state data, or some subset thereof, to the augmented stub. In this way, the node list and/or stub array may be updated to reflect the current state of cluster membership. In one embodiment, the augmented stub may send its unique identifier to a node each time the client accesses the application component. In another embodiment, the augmented stub may send its unique identifier to a node on a periodic or aperiodic basis.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
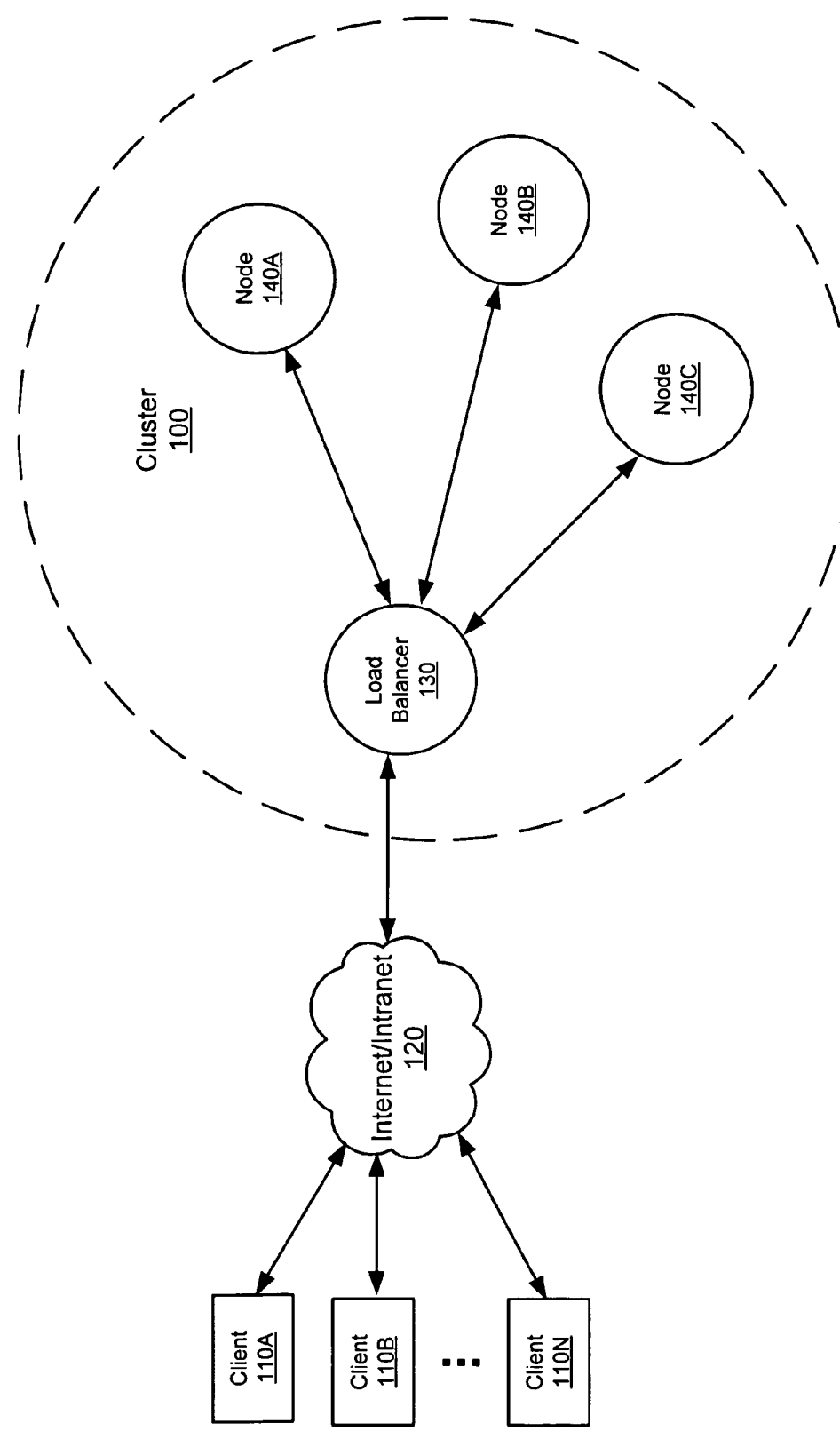
FIG. 1 illustrates a networked computer system including a cluster, according to prior art.
Figure 2:
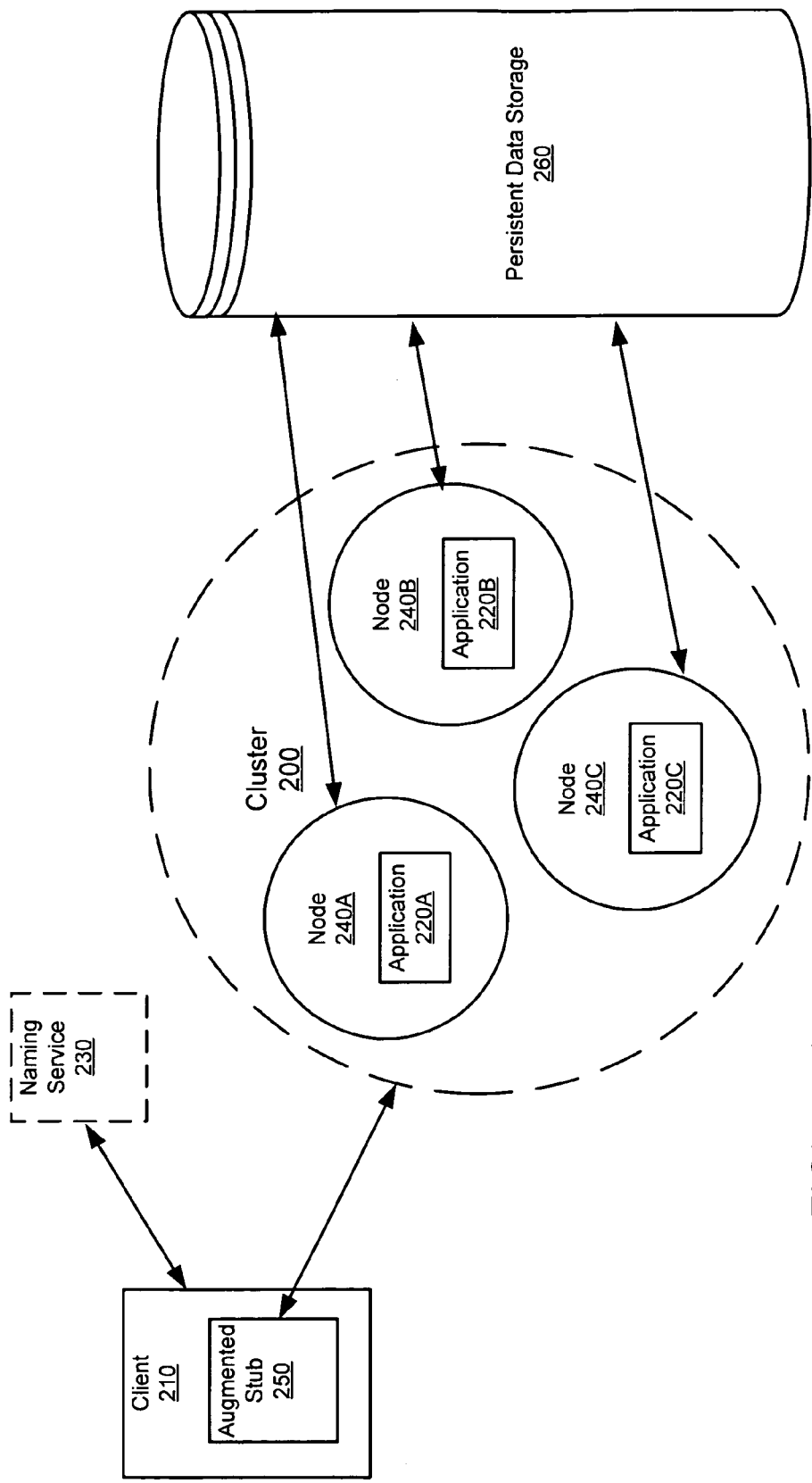
FIG. 2 illustrates the components of a computer system including an augmented stub, according to one embodiment.

FIG. 2 illustrates the components of a computer system, which may be suitable for implementing various embodiments of the disclosed invention. Cluster 200 may include two or more processing nodes 240. Each cluster node 240 may execute one or more application components 220. Application component 220 may provide a service or other functionality accessed by client 210. In one embodiment, application component 220 may be an instantiation of an EJB. An augmented stub 250 may implement an interface of the business object so that it looks like the business object 220 to the client 210. But the augmented stub 250 does not include the business logic of the business object 220. Instead it may include a stub with a connection to the business object 220. The augmented stub 250 is referred to as an "augmented" stub in comparison to a normal stub because it includes fail-over functionality, as described below, that operates transparently to the client. Augmented stub 250 appears to the client as a normal stub for the application component.

The augmented stub 250 for an application component 220 may act as a client's local representative or proxy for the application component 220. The client may invoke a method on the augmented stub, which is responsible for carrying out the method call on the application component 220. In one embodiment, the mechanism for performing a method call on application component 220 may be RMI. In RMI, a stub within the augmented stub for the application component may implement the same set of remote interfaces that the application component implements. The augmented stub appears as a normal stub to the client. When the augmented stub's method is invoked, the normal stub within the augmented stub may initiate communication over a connection with the cluster node containing the application component, marshal (write and transmit) the parameters to the application component, wait for the result of the method invocation, un-marshal (read) the return value or exception returned, and return the value to the client. The stub may hide the serialization of parameters and the network-level communication in order to present a simple invocation mechanism to the client.

For a client 210 to invoke a method on an application component 220, that client may first need to obtain a reference to the object. A reference to an application component may be obtained from a naming service 230.

When client 210 requests the lookup of an application component 220, naming service 230 may return the augmented stub 250 for the requested application component to the client. In some embodiments, naming service 230 may be cluster-aware, and if the requested object is executing on a cluster, it may return the augmented stub to the client, whereas if the requested object is executing on a single server, it may simply return a normal stub for the requested object. In one embodiment, in response to an initial lookup request for an application component, naming service 230 may return an augmented home stub that includes a normal home stub for the application component. Once the client 210 has obtained the augmented home stub (which appears to the client as the normal home interface to the desired application component 220), it may invoke the create( ) or find( ) methods provided by the home interface to obtain the application component's remote interface (which may be returned as an augmented remote stub).

In one embodiment, if the distributed application component 220 is stateful, that is if it includes data that must be maintained between client requests or longer, then the component may store the that persistent data to commonly accessible persistent data storage 260. In one embodiment persistent data storage 260 may be a database running on a backend system coupled to the cluster by a network. In order to support the persistence requirements of application components 220 and failure recovery methods of cluster 200, persistent data storage 260 may be accessible by all cluster members 240.

Figure 2A:
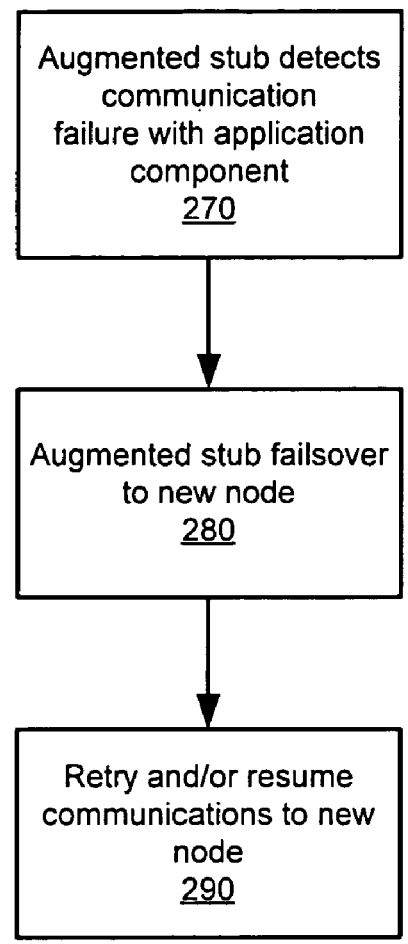
FIG. 2A is a flowchart of one embodiment of a method for fail-over in a cluster using an augmented stub.

FIG. 2A is a flowchart of one embodiment of a method for fail-over using an augmented stub. At block 270, the augmented stub may detect a communication failure associated with its included stub. For example, the node providing the application component corresponding to the augmented stub may have failed. In response to the node failure, as shown in block 280, the augmented stub may failover to a new node. In one embodiment this may involve obtaining within the augmented stub a new to an instance of the application component on the new node. Using the new stub, the augmented stub may then retry and/or resume communications to the new node. This fail-over may occur transparently to the client.

Figure 3:
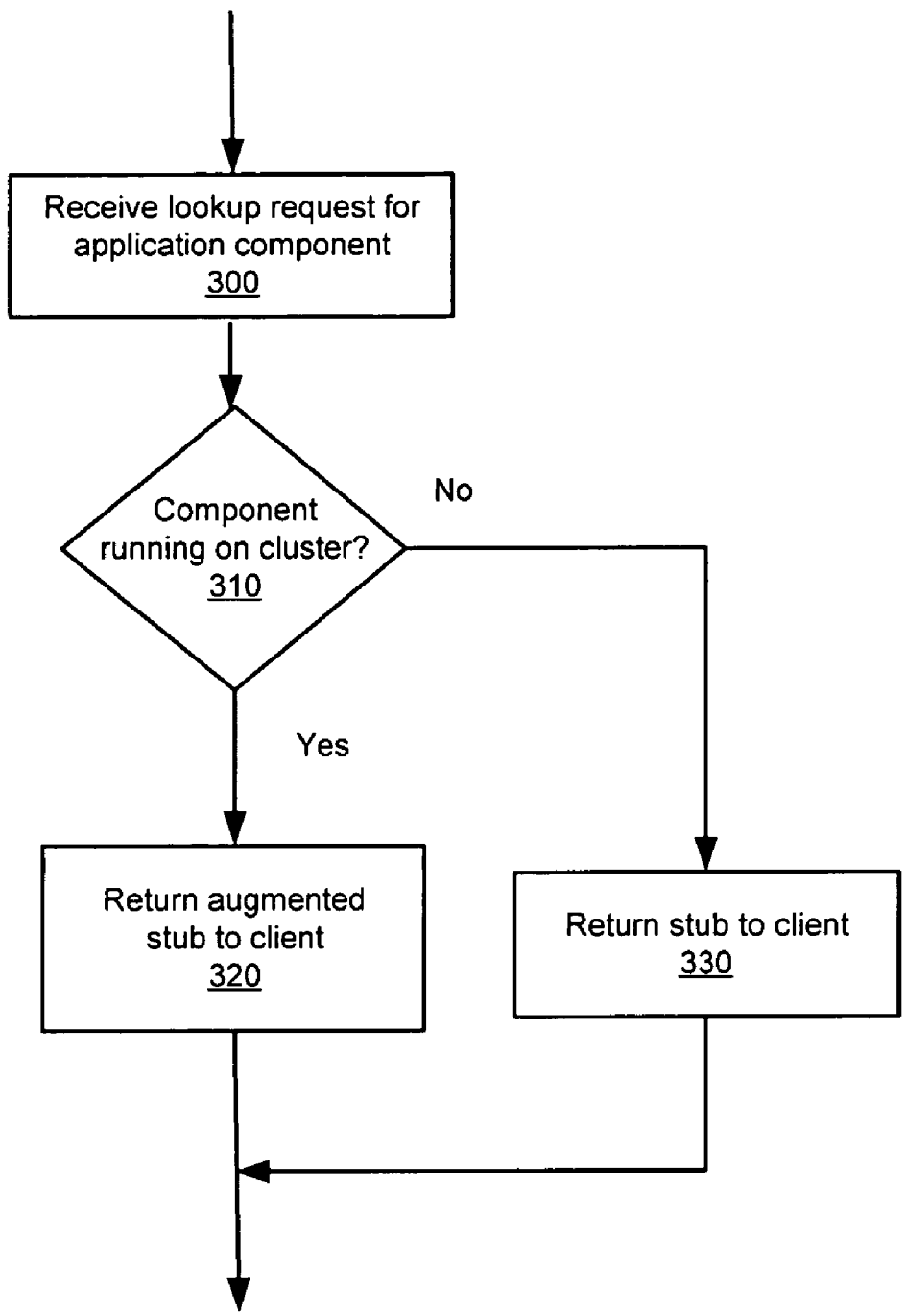
FIG. 3 is a flow chart of a method for operating a naming service, according to one embodiment.

FIG. 3 is a flow chart of a method for a naming service to facilitate fail-over, according to one embodiment. At block 300, the naming service may receive a lookup request for an application component from a client. The naming service may include information on the nodes running the application component to determine whether the requested component is executing on a cluster, as indicated in decision block 310. If the requested application component is only running on a single server (non-cluster configuration), then the naming service may return a normal stub to the requesting client, as shown in block 330. However, if multiple instances of the application are determined to be running as a cluster, at decision block 310, then the naming service may return an augmented stub to the client, as indicated in block 320. The augmented stub may include a normal stub to the client and may also transparently provide fail-over functionality, as further described herein.

Figure 4:
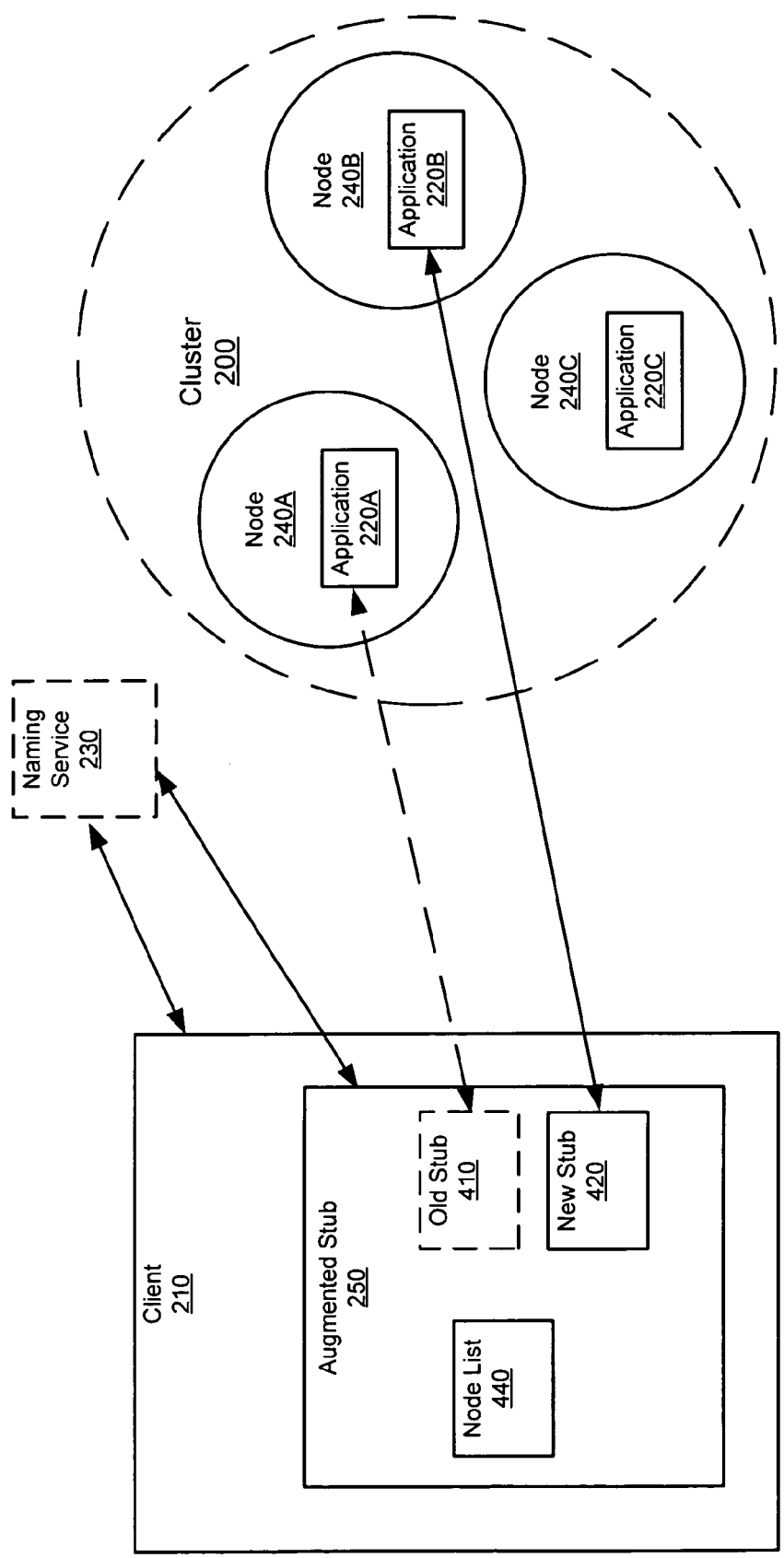
FIG. 4 illustrates the components of an augmented stub, according to one embodiment.

FIG. 4 illustrates the components of an augmented stub, according to one embodiment. Client 210, may include augmented stub 430. Augmented stub 430 may have been returned by a cluster-aware naming service in response to a look-up request from the client, as described above. Augmented stub 430 may include node list 440 a stub (e.g. stub 410) to an application component. To the client 210, augmented stub 250 may appear as a normal stub for the application component. When client 210 wants to invoke a function of an application component 220 running on the nodes of cluster 200, it may send a lookup request for the required component to naming service 230. Naming service 230 may provide client 210 with augmented stub 430 including node list 440 and stub 410. Node list 440 may include the names of each node 240 in cluster 200 that is running the application component. Stub 410 may provide a connection with one of the nodes from node list 440, for example node 240A. Client 210 may use stub 410 (transparently via augmented stub 250) to access the application component instance running on node 240A.

At some point, cluster node 240A may experience a failure. This failure could be a hardware failure of the platform of the node, a software failure in the application component itself or the supporting software running on the platform, or a failure in the network linking the node to the rest of the cluster. Augmented stub 430 may detect this loss of communication with node 240A and select another node from node list 440 that is running the application component. For example, if node list 440 includes nodes 240A, B, and C, and augmented stub 430 detects the failure of node 240A, it may select node 240B to fail-over the application component. Augmented stub 430 may send a lookup request to naming service 230, which may return new stub 420 for application instance 220B, so that new stub 420 may be obtained to replace old stub 410. Augmented stub 430 may use new stub 420 to send the client request that failed on node 240A, and all subsequent requests to node 240B. Augmented stub 430 may perform the functions described above completely transparently to the client 210, thus allowing for graceful failover of remote services provided for the client from node 240A to node 240B.

Figure 5:
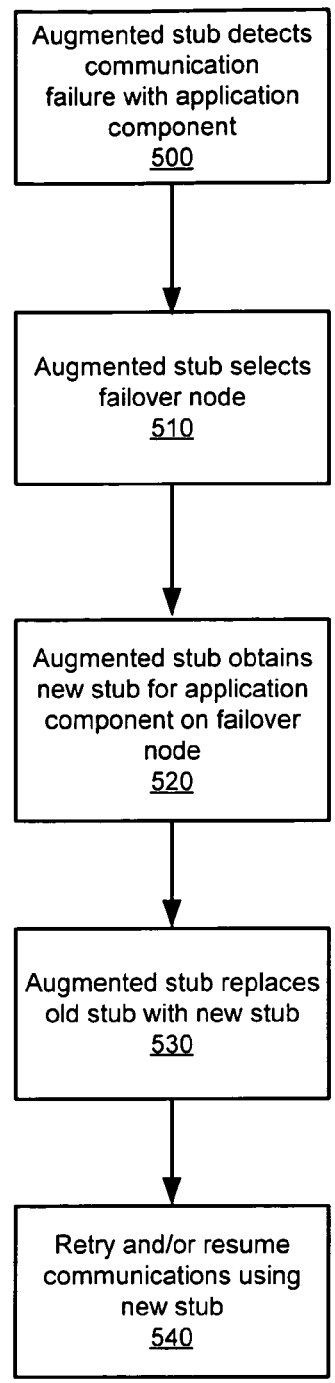
FIG. 5 is a flowchart of a method for fail-over in a cluster using an augmented stub, according to one embodiment.

FIG. 5 is a flowchart of a method for fail-over in a cluster using an augmented stub, according to one embodiment. At block 500, an augmented stub may detect a communication failure associated with its included stub. For example, the node connected to the current stub included in the augmented stub may have failed. As indicated at block 510, the augmented node may select a failover node from a list of cluster nodes running the required application component, which it maintains. The augmented node may obtain a new stub connecting to the instance of the required application component executing on the failover node, as shown in block 520. In one embodiment, the augmented stub may obtain a new stub connecting to the failover node by sending a lookup request to a naming service. At block 520, the augmented node may replace the old stub connected to the failed node with the new stub connected to the active node. With the new node in place, the augmented node may retry and/or resume communications with the application component on the failover node, as indicated in block 540, transparently to the client.

Figure 6:
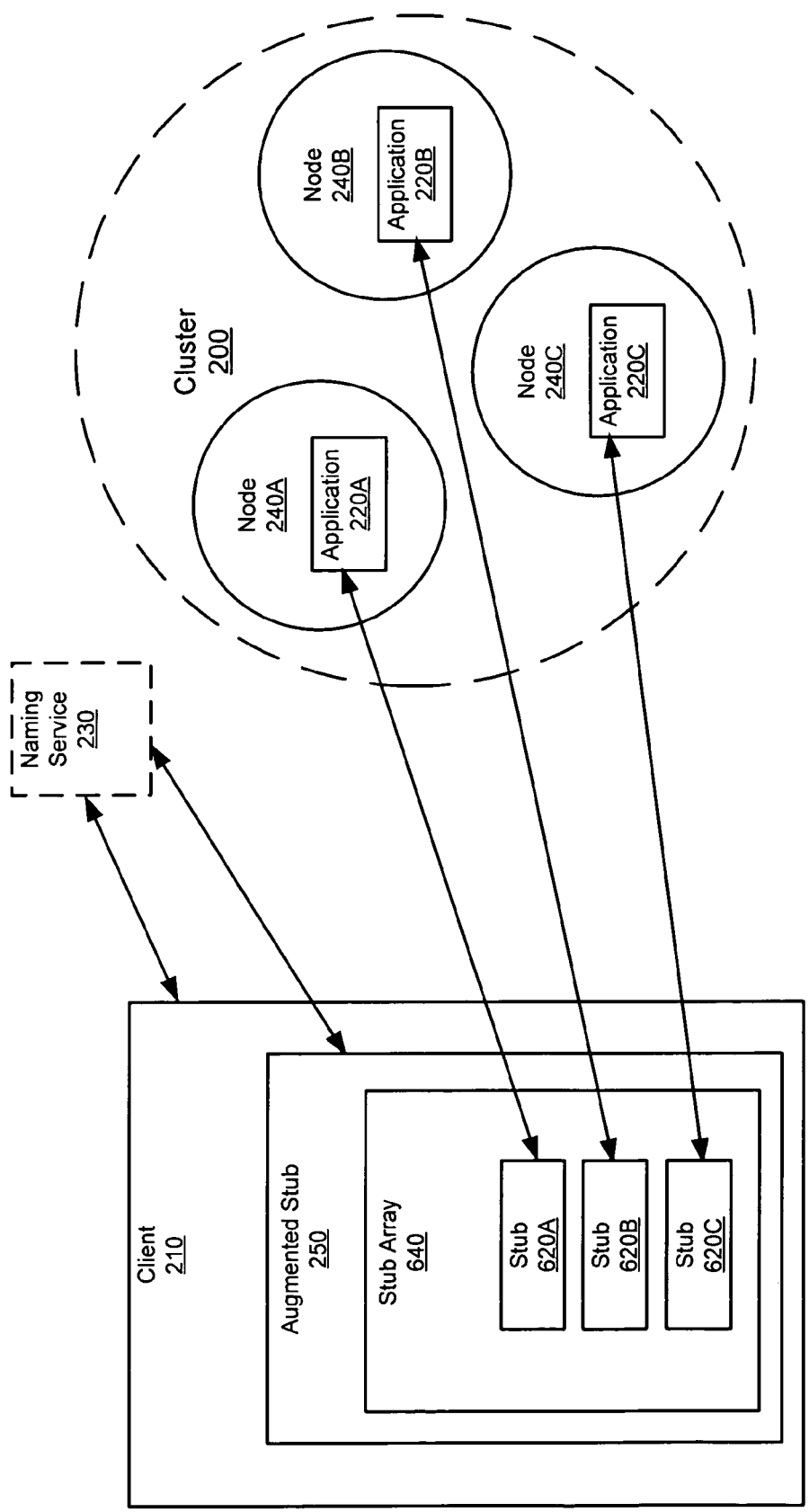
FIG. 6 illustrates the components of an augmented stub, according to another embodiment.

FIG. 6 illustrates the components of an augmented stub, according to another embodiment. Augmented stub 250 may include stub group or array 640, which includes stubs 620. Each stub 620 may be configured to provide an interface to different instances of the same application component on different nodes of cluster 200 to which the augmented stub can failover in the event of a node failure. For example, augmented stub 250 may initially select one stub (e.g. stub 620A) from stub array 640 to use in communicating with an instance of the distributed application component running on a node of the cluster (e.g. node 240A). All client 210 requests for communications with the application component may be sent to node 240A using this stub. Since all other stubs in the stub array 640 are linked to cluster nodes which host the required application component, they are candidates to become the failover node should node 240A experience a failure.

The augmented stub 250 may detect loss of communication with the application component 220A or failure of node 240A. In response to such a failure, augmented stub 250 may select another stub from stub array 640, for example stub 620B. The node associated with the selected stub 620B, in this case node 240B, then becomes the failover node for recovering the required functionality of the application component. The augmented stub 250 may retry and/or resume communications with the application component using stub 620B. This fail-over functionality of the augmented stub may occur transparently to client 210. For example, client 210 may be unaware of the fail-over to a different node in the cluster.

Figure 7:
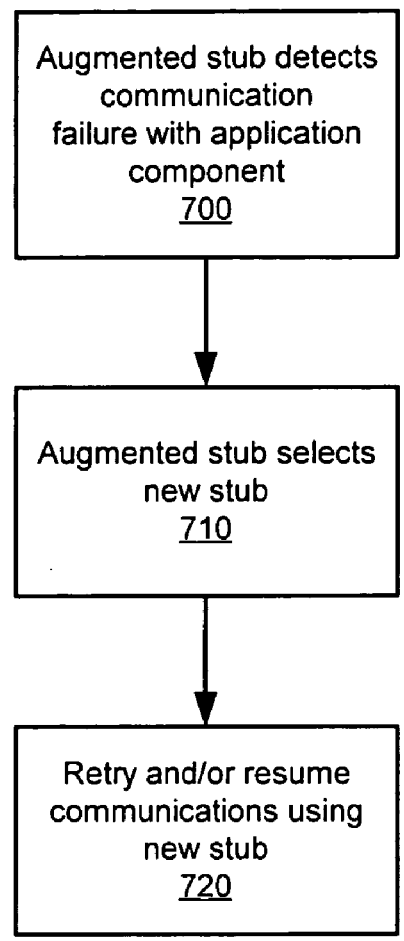
FIG. 7 is a flowchart for a method of operating an augmented stub, according to one embodiment.

FIG. 7 is a flowchart for a method of cluster fail-over using an augmented stub, according to one embodiment. A client may use an augmented stub to interface to a clustered application component. As described above, the augmented stub may include a group or array of stubs for interfacing to different instances of the application component on different nodes of the cluster. At some point in time, the augmented stub may detect a communication failure with the application component associated with the stub currently in use, as indicated in block 700. In one embodiment, the augmented stub may remove the stub currently in use from the stub array in response to a failure of the corresponding node.

As shown in block 710, the augmented node may select a new stub from the stub array. The node corresponding to the selected stub may become the failover node to provide the application component functionality. The new stub may be selected randomly or by using a load balancing mechanism, or by any other selection technique. In one embodiment, the augmented stub may select the new stub based on a round robin method. In another embodiment, the augmented stub may include data on cluster workload distribution, and may select a stub corresponding to the node whose workload is currently lightest. Regardless of the selection method, once the new stub has been placed into service, the augmented node may retry and/or resume communication with the application component instance running on the failover node using the new stub, as shown in block 720. This fail-over may occur transparently to the client.

In order to successfully failover the application component from a failed node to a failover node, the augmented stub 250 may need to maintain data concerning the state of the cluster membership. In one embodiment augmented stub 250 may maintain node list 440. As described previously, node list 440 may include identification of all cluster nodes capable of providing the application component. Therefore, node list 440 represents a list of nodes that are candidates to assume the role of failover node in the event that the node currently being accessed should fail. Cluster membership may change with time as nodes fail or are removed from the cluster for other reasons. Additionally, failed nodes may recover and rejoin the cluster, or new nodes may be added to the cluster.

In another embodiment, the augmented stub may include a stub array 640 that may include stubs configured to connect to all nodes in cluster 200 that are capable of providing the application component, including the one that is currently being used to provide communications with an instance of the application component. As described in the previous paragraph, cluster membership may evolve with time, and stubs linked to failover candidates at one point may be invalid at another point, whereas when new failover candidate nodes join the cluster, corresponding stubs should be added to the stub array 640. One method of keeping the node list 440 or stub array 640 up to date may be through the use of a cluster membership state identifier (e.g. epoch number) as described below.

Figure 8:
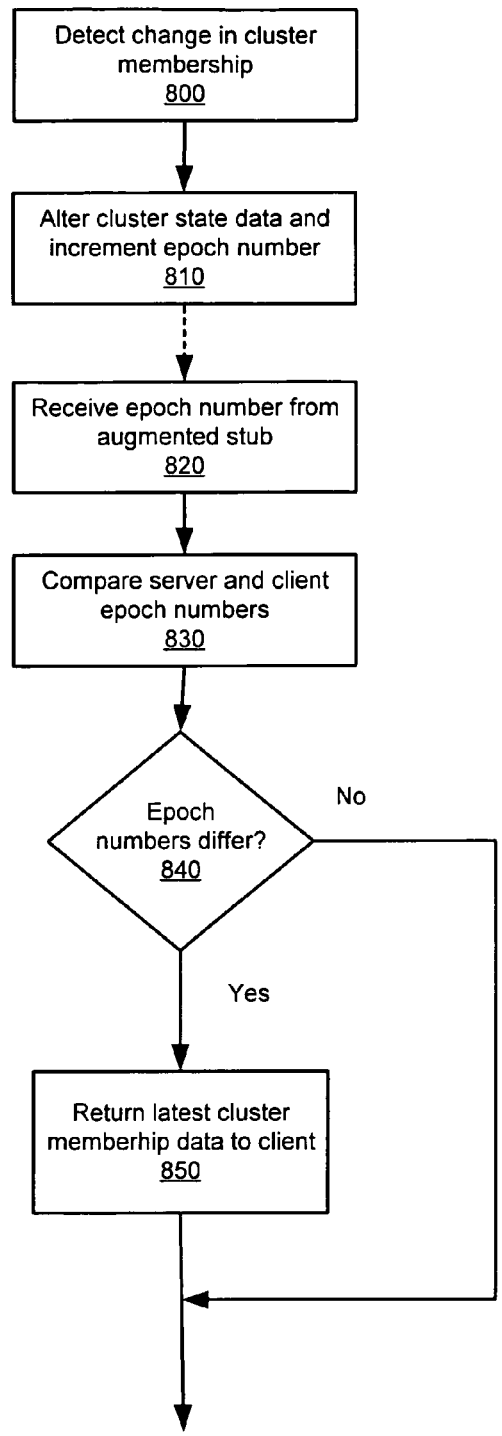
FIG. 8 is a flowchart of a method of operating cluster nodes including cluster epoch numbers, according to one embodiment.

FIG. 8 is a flowchart of a method for updating cluster membership in an augmented stub, according to one embodiment. Each node may maintain cluster state data including cluster membership data. The cluster state data may also include a unique identifier, such as an epoch number that, indicates the cluster configuration during a given period of time. As shown in block 800, each cluster node may be capable of detecting changes to the cluster configuration. In one embodiment, this may include some central agent that detects node additions and deletions and sends update information to all cluster members. In other embodiments, cluster nodes may use a peer-to-peer or other communication mechanism to communicate cluster membership change events. When a membership change is detected, each member may alter its cluster state data to reflect the change, as indicated in block 810. This alteration of cluster state data may include the changing of the unique identifier (e.g. epoch number). In some embodiments, the unique identifier may be an epoch number that is incremented each time there is a change in cluster membership.

As indicated in block 820, at some point in time a cluster node may receive a request from an augmented stub including an identifier (e.g. epoch number) indicating the configuration in which the augmented stub believes that cluster to be. This augmented stub's identifier may correspond to the membership of the node list 440 in one embodiment, or the stub array 640 in another embodiment. As indicate in block 830, the node may compare the received cluster membership identifier with its own identifier. For example, in an embodiment using epoch numbers as unique identifiers of cluster membership state, the node may compare the epoch number received from the augmented stub to its own epoch number. If the two identifiers differ, as determined in decision block 840, the node may return its copy of the cluster state data, or some subset thereof, to the augmented stub, as shown in block 850. In this way, node list 440 and/or stub array 640 may be updated to reflect the current state of cluster membership. In an embodiment in which the augmented stub includes a stub array, the augmented stub may send a lookup request to a naming service to obtain a new stub for any new cluster members in order to update its stub array. In one embodiment, augmented stub 250 may send its cluster membership state identifier to a node each time the client accesses the node. In another embodiment, augmented stub 250 may send its epoch number to a node on a periodic or aperiodic basis, unassociated with client accesses.

Distributed applications components 220 may be either stateless or stateful. Graceful failover of a stateless application component may only require the instantiation of the component on the failover node since the new instance can immediately provide the same functionality as the failed instance.

Failing over a stateful application component in such a way that the client 210 is completely unaware of the failure, may be somewhat more complex. Apart from similar recovery of the application component instance on the failover node, the state of the application component must be restored on the new instance. Since access to a node's memory is lost with the failure of the node, graceful failover of a stateful application component may require that the component persist state data to a persistent store available to other nodes of the cluster, as updates to the state occur.

In one embodiment, an instance of application component 220 may persist its state data to persistent data storage 260 whenever a change occurs. In another embodiment, the container in which application component 220 is executing may be responsible for persisting changes to the application component state for that instance. In both of these cases, the persistent data store 260 may include the latest version of the application component state.

If the node executing a particular instance of application component 220 should fail, all the other nodes of the cluster may have access to its state data in persistent data store 260. Once the augmented stub associated with the failed instance has instantiated a new instance of the application component on another node, the new instance may be able to locate and access the state data of the failed instance using a primary key supplied by the augmented stub.

Some application component containers may provide only limited failover capability. In this case, whenever an instance of a stateful application component is created, a duplicate or mirror copy may be placed on another node in the same cluster. The duplicate may not be used unless the node running the primary fails, in which case the duplicate may assume the role of the primary and nominate another duplicate. Each time a transaction on the primary commits, its state is synchronized with that of the duplicate. If the primary instance should fail, augmented stub may failover and use the duplicate instance, which has the latest state data.

Figure 9:
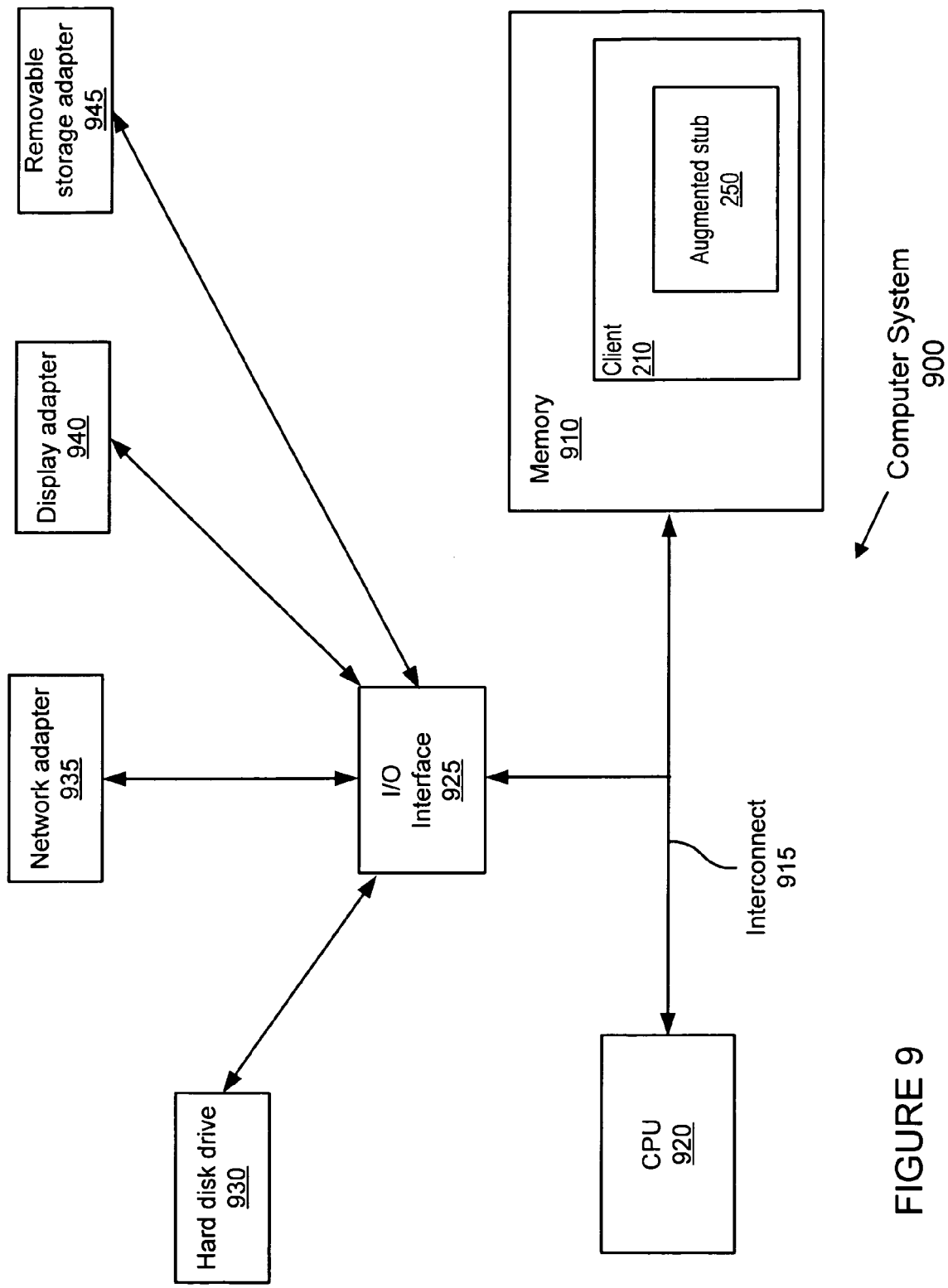
FIG. 9 illustrates an exemplary computer system according to one embodiment.

FIG. 9 illustrates one embodiment of a computer system 900 that may include a client 210 including an augmented stub 250, as described herein. The computer system 900 may also be suitable to function as a cluster node, as described herein. Computer system 900 may include many different components such as memory 910, a central processing unit (CPU) or processor 920, and an input/output (I/O) interface 925. Interconnect 915 is relied upon to communicate data from one component to another. For example, interconnect 915 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 900 preferably includes a memory medium on which computer programs according to various embodiments may be stored. The term "memory medium" may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 930, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 900 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 910 may store program instructions accessed by the CPU 920. For example, instructions and data implementing a client and an augmented stub 250 may be stored in memory 910. Augmented stub 250 may facilitate the graceful failover of remote application components running on application servers that are members of server clusters.

Computer system 900 may further include other software and hardware components, such as an input/output (I/O) interface 925, that may be coupled to various other components and memory 910. The CPU 920 may acquire instructions and/or data through the I/O interface 925. Through the I/O interface 925, the CPU 920 may also be coupled to one or more I/O components. As illustrated, I/O components may include a hard disk drive 930, a network adapter 935, a display adapter 940 and/or a removable storage adapter 945. Some components 930 to 945 may be coupled to the I/O interface 925. In addition, the computer system 900 may include one or more of a particular type of component. The computer system 900 may include one or more components coupled to the system through a component other than the I/O interface 925. Some computer systems may include additional and/or other components such as application software (e.g., stored in memory 910), other CPUs, video monitors or other displays, track balls, mice, keyboards, printers, plotters, scanners, or other types of I/O devices for use with computer system 900.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
   a cluster, comprising a plurality of nodes configured to execute a distributed application component;
   a client configured to generate a lookup request for the application component;
   a naming service configured to respond to the lookup request, wherein the naming service is configured to, in response to the lookup request:
   determine whether the application component is executing on the cluster;
   return an augmented stub if the application component is executing on the cluster; and
   return a normal stub if the application component is not executing on the cluster;
   wherein the client is configured to access the application component using the augmented stub; and
   the augmented stub is configured to:
   interface to an instance of the application component on one of the nodes;
   in response to a failure of the one of the nodes, failover to another one of the nodes, transparent to the client; and interface to another instance of the application component on the another one of the nodes.

2. The system, as recited in claim 1, wherein the augmented stub comprises a stub to communicate with the one of the nodes and an indication of other ones of the nodes to which the application component can be failed over, wherein to failover, the augmented stub is configured to:
   select the another one of the nodes based on the indication;
   obtain a new stub corresponding to the another one of the nodes;
   replace the stub with the new stub; and
   retry and/or resume communication using the new stub.

3. The system, as recited in claim 1, wherein the augmented stub comprises a plurality of stubs, wherein one of the stubs is configured to communicate with the one of the nodes and each of the other stubs is configured to communicate with one of the other nodes of the plurality of nodes to which the application component can be failed over, wherein to failover, the augmented stub is configured to:
   select a new stub from the other stubs; and
   retry and/or resume communication using the new stub.

4. The system, as recited in claim 1, wherein each cluster node comprises node cluster membership data comprising a node unique identifier indicative of cluster membership during a period of time, and wherein each cluster node is configured to detect a change in cluster membership and, in response to said detecting, to update the cluster membership data including the unique identifier.

5. The system, as recited in claim 4, wherein the augmented stub comprises client cluster membership data comprising a client unique identifier indicative of cluster membership during a period of time and is configured to:
   send the client identifier to one of the plurality of nodes;
   receive node cluster membership data; and
   update the client cluster membership data based on the node cluster membership data.

6. A method, comprising:
   a client generating a lookup request to a naming service for an application component;
   the naming service responding to the lookup request, wherein the naming service responding to the lookup request comprises:
      determining whether the application component is executing on a cluster;
      returning an augmented stub if the application component is executing on a cluster; and
      returning a normal stub if the application component is not executing on a cluster;
   the client accessing the application component using the augmented stub;
   the augmented stub interfacing to a first instance of the application component on a first node of a cluster;
   in response to a failure of the first node, the augmented stub failing over to a second node of the cluster transparent to the client; and
   the augmented stub interfacing to a second instance of the application component on the second node.

7. The method, as recited in claim 6, wherein the augmented stub comprises a stub to communicate with the first node and data on other nodes of the cluster to which the application component can be failed over, wherein failing over comprises:
   selecting the second node based on the data;
   obtaining a new stub corresponding to the selected node;
   replacing the stub with the new stub; and
   retrying and/or resuming communication using the new stub.

8. The method, as recited in claim 6, wherein the augmented stub comprises a plurality of stubs, wherein one of the stubs is configured to communicate with the first node and each of the other stubs is configured to communicate with one of the other nodes of the cluster to which the application component can be failed over, wherein failing over comprises:
   selecting a new stub from the other stubs; and
   retrying and/or resuming communication using the new stub.

9. The method, as recited in claim 6, wherein each cluster node comprises node cluster membership data comprising a node unique identifier indicative of cluster membership during a period of time, further comprising each cluster node detecting a change in cluster membership and, in response to said detecting, updating the cluster membership data including the unique identifier.

10. The method, as recited in claim 9, further comprising:
    the augmented stub sending to one of the plurality of nodes a unique identifier representing cluster membership information last received by the augmented stub;
    comparing the unique identifier from the augmented stub to the node's unique identifier indicative of current cluster membership; and
    updating cluster membership to the augmented stub if said comparing indicates a change in cluster membership.

11. A method comprising:
    receiving a lookup request for an application component from a client;
    determining whether the application component is executing on a cluster;
    in response to the lookup request:
       returning an augmented stub for interfacing to the application component if the application component is executing on a cluster, wherein the augmented stub is configured to provide fail-over for the application component to another node in the cluster transparently to the client; and
       returning a normal stub for interfacing to the application component if the application component is not executing on a cluster.

12. The method, as recited in claim 11, wherein said receiving, determining, and returning is performed by a naming service.

13. A computer-accessible medium comprising program instructions, wherein the program instructions are computer-executable to implement:
    a client configured to generate a lookup request for an application component;
    a naming service configured to respond to the lookup request, wherein the naming service is configured to, in response to the lookup request:
       determine whether the application component is executing on a cluster;
       return an augmented stub if the application component is executing on a cluster; and
       return a normal stub if the application component is not executing on a cluster
    wherein the client is configured to access the application component using the augmented stub;
    the augmented stub configured to:
       interface to an instance of the application component on a first node of a cluster;
       in response to a failure of the first node, failover to a second node of the cluster, transparent to the client; and interface to another instance of the application component on the second node.

14. The computer-accessible medium, as recited in claim 13, wherein the augmented stub comprises a stub to communicate with the first node and data on other nodes of the cluster to which the application component can be failed over, wherein to failover, the augmented stub is configured to:
- select the select the second node based on the data;
- obtain a new stub corresponding to the second node;
- replace the stub with the new stub; and
- retry and/or resume communication using the new stub.

15. The computer-accessible medium, as recited in claim 13, wherein the augmented stub comprises a plurality of stubs, wherein one of the stubs is configured to communicate with the node and each of the other stubs is configured to communicate with one of the other nodes of the plurality of nodes to which the application component can be failed over, wherein to failover, the augmented stub is configured to:
- select a new stub from the other stubs; and
- retry and/or resume communication using the new stub.

16. The computer-accessible medium, as recited in claim 13, wherein each cluster node comprises node cluster membership data comprising a node unique identifier indicative of cluster membership during a period of time, and wherein each cluster node is configured to detect a change in cluster membership and, in response to said detecting, to update the cluster membership data including the unique identifier.

17. The computer-accessible medium, as recited in claim 16, wherein the augmented stub is configured to:
- send to one of the plurality of nodes a unique identifier representing cluster membership information last received by the augmented stub; and
- receive an update of cluster membership if the unique identifier from the augmented stub differs from the node's unique identifier indicative of current cluster membership.

* * * * *